Figure 1:
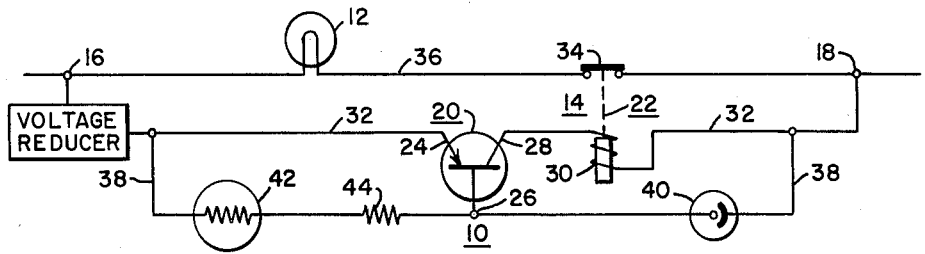

Oct. 5, 1965    V. G. KRENKE    3,210,611
LIGHT RESPONSIVE SWITCHING CIRCUIT HAVING TIME DELAYED OPERATION
Filed May 11, 1962

WITNESSES:
Bernard R. Gieques
Edward F. Possessky

INVENTOR
Vincent G. Krenke
BY
Smith
ATTORNEY

United States Patent Office 3,210,611
Patented Oct. 5, 1965

3,210,611
LIGHT RESPONSIVE SWITCHING CIRCUIT
HAVING TIME DELAYED OPERATION
Vincent G. Krenke, Carnegie, Pa., assignor, by mesne assignments, to Westinghouse Electric Corporation, a corporation of Pennsylvania
Filed May 11, 1962, Ser. No. 193,949
8 Claims. (Cl. 317—130)

The present invention relates to electro-optical control circuits and more particularly to such circuits which induce load control action in response to persistent light changes as distinguished from transient light changes.

There are numerous applications where it is desirable to control the energization of a load device in response to ambient or other light or optical conditions. Such control when used with a load device such as a lamp, for example, can enable the lamp to produce illumination only when and if ambient light falls below a prescribed level. In any case, however, it is often advantageous to have load control action induced only if a change in light conditions is of a steady state rather than a transient nature. In this manner, wasteful and objectionable fluctuation in load energization is avoided.

In order to provide the functions so far described in a control circuit, it is evident in the first place that the circuit should include a light responsive element either as a molecularly integral portion or as an interconnected component thereof. Further, means can be provided for postponing or delaying load control action until some reasonable length of time after a light change occurs so as to ensure that such action is induced only if the light change persists for a period of time greater than that which would be characterized as transient.

Accordingly, it is an object of the invention to provide a novel electro-optical circuit for controlling the energization of a load device such that load control action is induced only if a light change persists for a given amount of time.

A further object of the invention is to provide a novel control circuit wherein a light responsive element and a temperature responsive resistor cooperate to operate the circuit only if a light change persists for a given amount of time.

Another object of the invention is to provide a novel control circuit wherein a light responsive element and a positive temperature coefficient resistor cooperate to operate the circuit only if a light change persists for a given amount of time.

It is an additional object of the invention to provide a novel control circuit wherein a semiconductive switching element and a light responsive element and a temperature responsive resistor cooperate to operate the circuit only if a light change persists for a given amount of time.

Another object of the invention is to provide a novel control circuit wherein a relay and a light responsive element and a temperature responsive resistor cooperate to operate the circuit only if a light change persists for a given amount of time.

It is a further object of the invention to provide a novel control circuit wherein the level of persisting light which induces load control action by the circuit and the time for that action to be effected can be varied.

These and other objects of the invention will become more apparent upon consideration of the following detailed description along with the attached drawing, in which:

FIGURES 1-4 show schematic diagrams of respective circuits arranged in accordance with the principles of the invention.

In accordance with the broad principles of the invention, an electro-optical circuit for controlling the energization of a load device comprises switching means serially connected with the load device, and a light responsive element and a temperature responsive element so interconnected with the switching means as to operate the latter only in response to light changes which persist for a given amount of time. The switching means can include a semiconductive switch, such as a transistor, as well as or alternatively an electromechanical switch, such as a relay or a bimetallic device. When a peristent change occurs in the light falling on the light responsive element, the amount of current flowing through the temperature responsive element is caused to alter over a delay period of time. At some point in time near or at the end of the delay period, the voltage and current conditions of the temperature and light responsive elements are such that the switching means are activated so that the load device is turned on or off as the case may be.

More specifically, in FIG. 1 there is shown a control circuit 10 arranged in accordance with the principles of the invention. To control the energization of a load device, in this case a lamp 12, switching means 14 are connected in the circuit 10 in such a manner as to be activated by power derived directly, or preferably by means of a reduced rectified voltage or the like, from power terminals 16 and 18. In this particular case, the switching means 14 include a semiconductive device, such as a transistor 20, and an electromechanical switch such as a relay 22. The transistor 20 is in this instance of the PNP type and is provided with emitter, base and collector terminals 24, 26 and 28, respectively. The relay 22 includes a coil 30 serially connected in transistor or emitter-collector path 32, and, in addition, contact means 34 for controlling the continuity of a path 36 through the lamp 12 and between the power terminals 16 and 18. In place of the relay 22, for example, a bimetallic device (not shown) can be employed as the noted electromechanical switch.

As noted previously, the load device or lamp 12 is to be controlled in such a manner to be energized or deenergized only if changes in light are sufficiently persistent to be characterized as steady state and not transient. This need is met if the switching means 14 are suitably controlled, and for this purpose a path 38, coupled between power terminals 16 and 18, includes a light responsive element 40 and a temperature responsive element 42. The light responsive element 40 is preferably characterized with resistance which varies substantially between light and dark conditions. For example, it can be in the form of any well known semiconductive device or photoelement which exhibits low resistance when subjected to a relatively elevated level of light and high resistance when subjected to a darkened condition.

Similarly, the temperature responsive element or resistor 42 is preferably characterized with resistance which varies substantially between low and high temperature conditions. For example, it can, as here, be in the form of a positive temperature coefficient semiconductive device or thermistor which exhibits low resistance with relatively small current flow and temperature rise and high resistance with relatively high current flow and temperature rise.

The path 38 additionally includes in this case a fixed (or variable) resistor 44. The resistor 44 and the thermistor 42 are serially connected between the emitter and base terminals 24 and 26 of the transistor 20 for the purpose of controlling switching action of the latter. Further, the photoelement 40 is coupled serially between the base terminal 26 of the transistor 20 and the power terminal 18. The relay contact means 34 are activated when the emitter-collector or transistor path 32 is switched into a conductive state to allow energy delivery to the relay coil 30 in an amount sufficient to allow actuation of the contact means 34.

With a sufficiently high level of light on the photoelement 40, such as that of daylight, the transistor 20 is caused to be sufficiently conductive to activate the relay 22 and therefore the relay contact means 34 are preferably normally closed so as to be held open by the relay coil 30 during this light condition. Conduction through the transistor 20 is occasioned by the fact that the photoelement 40 is characterized with low resistance and sufficient current therefore flows through the thermistor 42 and the resistor 44 to produce sufficient forward bias across the emitter and base terminals 24 and 26 of the transistor 20 to result in a relay holding current through the transistor path 32. In the darkened condition, the photoelement 40 is characterized with high resistance so that the thermistor 42 and the resistor 44 are characterized with current and voltage conditions which are insufficient to bias the transistor 20 into a state of forward conduction or at least insufficient to allow the transistor path 32 to conduct the amount of current required for relay activation.

When the light level on the photoelement 40 undergoes a change which would call for a change in the energization of the lamp 12, some delay in lamp control action is occasioned by the operating nature of the thermistor 42. Thus, for example, if the photoelement 40 is initially darkened, and light level is increased so as to call for deenergization of the lamp 12, the resistance of the photoelement 40 is decreased and the temperature and resistance of the thermistor 42 increases slowly in response to increased current flow through it. At some later time when the thermistor temperature has risen to a given point, the thermistor resistance increases sharply and sufficient forward bias is then created to allow a relay activating current to flow through the transistor path 32. On the other hand, if the increase in ambient light level is terminated shortly after its appearance, as would be occasioned for example by moving automobile headlamps, then the resistance of the photoelement 40 is again increased to reduce the current through the thermistor 42. The thermistor temperature then drops and the current through the transistor path 32 is caused to decrease to its beginning level (which might be substantially zero) before it would have reached a level sufficient for activating the relay 22.

Figure 2:
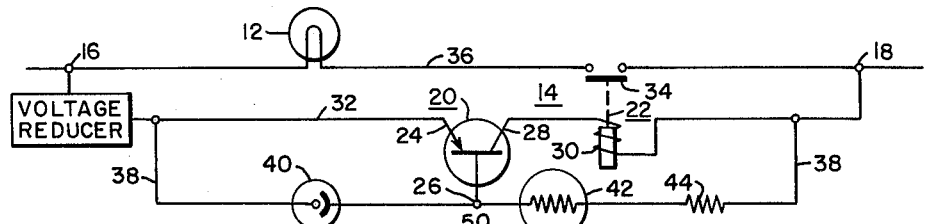

In FIG. 2, there is shown another control circuit 50 as another embodiment of the invention. The circuit 50 is similar to the circuit 10 of FIG. 1 and therefore similar reference characters have been employed for similar elements. In this case, the relay contact means 34 are normally open since little or no current flows through the transistor path 32 under relatively elevated levels of light on the photoelement 40. Thus, the photoelement 40 is in this instance connected serially between the emitter and base terminals 24 and 26 of the transistor 20 and therefore under the stated condition of light is characterized with a relatively low resistance and produces insufficient forward bias on the transistor 20 to induce the flow of a relay activating current through the transistor path 32.

Further, the thermistor 42 and the resistor 44 are in this case coupled serially between the transistor base terminal 26 and the power terminal 18. The thermistor 42 under the stated condition of light is characterized with a relatively high resistance as the result of current flow through it. When the light condition is altered, for example if darkness appears, the resistance of the photoelement 40 is increased so as to reduce current flow through the thermistor 42. Cooling of the thermistor 42 is delayed in time, but when the thermistor temperature has dropped to a given point, the thermistor resistance decreases sharply and voltage and current conditions of the photoelement 40 cause the transistor 20 to be sufficiently forward biased to cause a relay activating current to flow through the transistor path 32. The contact means 34 are then closed and the lamp 12 is illuminated as the result of energy delivery from the power terminals 16 and 18.

Figure 3:
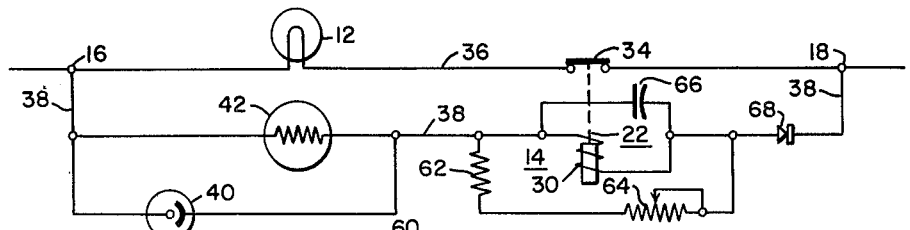
Figure 4:
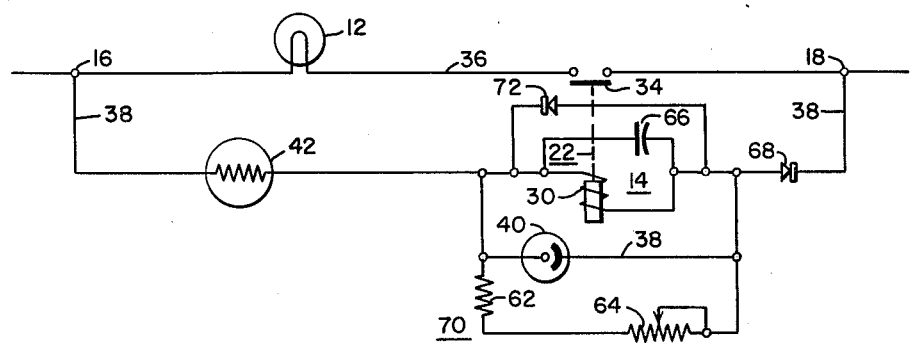

Additional embodiments of the invention are shown in FIGS. 3 and 4 in the form of control circuits 60 and 70. The circuits 60 and 70 are similar to the circuit 10 of FIG. 1 and therefore similar reference characters have again been employed for similar elements. The switching means 14 in each of the circuits 60 or 70 comprise the relay 22. The photoelement 40 and the thermistor 42 are again included in the path 38 which in these examples is preferably connected directly between the power terminals 16 and 18 for the purpose of controlling activation or deactivation of the relay 22.

In the circuit 60 of FIG. 3, the photoelement 40 and the thermistor 42 are connected in a parallel combination and the relay coil 30 is bridged by a fixed resistor 62 and a variable resistor 64. A capacitor 66 is employed to dampen or prevent chatter of the relay contact means 34, and a diode 68 is included in the path 38 to reduce control power consumption and in addition to allow the use of a direct current relay.

In operation, the total resistance effected by the photoelement 40 and the thermistor 42 is determinative of whether sufficient voltage is developed across the relay coil 30 to open the relay contact means 34 which are normally closed. For example, under normal daylight the resistance of the photoelement 40 is relatively low and current through the path 38 therefore tends to bypass the thermistor 42 through the photoelement 40. Accordingly, heating of the thermistor 42 tends to be minimized and its temperature and resistance are relatively low. The total equivalent resistance of the photoelement 40 and the thermistor 42 is therefore relatively low and sufficient voltage is developed across the relay coil 30 to activate the relay contact means 34 to an open position and thereby deenergize the lamp 12.

When the photoelement 40 is darkened, its resistance becomes relatively high and current through the path 38 tends to be shunted through the thermistor 42. In turn, the thermistor 42 becomes heated and after a time delay as in the case of FIG. 1 and FIG. 2 the thermistor resistance increases sharply. The total equivalent resistance of the photoelement 40 and the thermistor 42 is then relatively high and the relay contact means 34 are deactivated so as to close and energize the lamp 12 since insufficient voltage then exists across the relay coil 30 for activation of the relay contact means 34. The fixed resistor 62 and the variable resistor 64 tend to fix the voltage drop across the relay coil 34 under any given circuit operating conditions and therefore are determinative of the amount of light which must fall on the photoelement 40 so as to produce activation of the relay contact means 34. For example, when the variable resistor 64 is set so as to be minimally resistive a given amount of light falling on the photoelement 40 will cause the latter to be sufficiently lowly resistive to produce activation of the relay contact means 34. If the variable resistor 64 is set so as to effect a greater or a maximum resistance, a relatively lower amount of light on the photoelement 40 will be effective to produce activation of the relay contact means 34.

With respect to the control circuit 70 of FIG. 4, the relay contact means 34 are normally open and are activated to a closed position when the photoelement 40 is relatively darkened. In this case, the thermistor 42 and the photoelement 40 are again connected in the path 38, but in a manner somewhat different from that of the control circuit 60. Thus, the photoelement 40 bridges both the relay coil 30 and the fixed resistor 62 and the variable resistor 64, and the thermistor 42 is connected in series with this parallel combination. If desired, a diode 72 can be employed in place of or in addition to the capacitor 66 for preventing relay chatter.

In operation, the photoelement 40 when subjected to light exhibits a relatively low resistance and therefore current through the path 38 tends to be relatively high so as to maximize the resistance of the thermistor 42. In these circumstances, the voltage across the relay coil 30 is insufficient to activate the relay contact means 34 and the lamp 12 is deenergized. When the photoelement 40 is darkened, current through the path 38 tends to be reduced and after a time delay, as in the case of the previous control circuits considered, the thermistor 42 is dropped in temperature and its resistance is sharply decreased. The voltage across the relay coil 30 then is sufficient to activate the relay contact means 34 and the lamp 12 is energized. Again, the variable resistor 64 is effective in controlling the level of light at which the relay contact means 34 are activated. Thus, as the resistance of the variable resistor 64 is increased, a relatively higher level of light will result in actuation of the relay contact means 34.

Several embodiments have been set forth in this description to point out the principles of the invention. Accordingly, it is desired that the invention be not limited by the embodiments described, but, rather, that the invention be interpreted in accordance with the scope and spirit of its broad principles.

What is claimed is:

1. A circuit for controlling the energization of a load device, said circuit comprising switching means for controlling the continuity of a path through said load device from a power source, said switching means including a semiconductive switch and an electromechanical switching device having contact means in said load device path, a light responsive element characterized with resistance which varies as a function of received light, a temperature responsive element characterized with resistance which varies as a function of its temperature, said semiconductive switch and an actuating element of said electromechanical switching device being serially connected in a path between power terminals, said light responsive and temperature responsive elements being connected between said power terminals, said light responsive element being so connected as to control the amount of current through said temperature responsive element, said temperature and light responsive elements being so connected as to control the amount of voltage applied to control terminals of said semiconductive switch and thereby effecting with time delay an activating change in the voltage applied to said actuating element of said electromechanical switch from said power terminals when a persisting change in light level on said light responsive element occurs.

2. A circuit as claimed in claim 1, wherein said electromechanical switching device is a relay and said activating element is a coil of said relay.

3. A circuit as claimed in claim 1, wherein said temperature responsive element is a positive temperature coefficient thermistor.

4. A circuit for controlling the energization of a load device, said circuit comprising switching means for controlling the continuity of a path through said load device from a power source, said switching means including a semiconductive switch and an electromechanical switching device having contact means in said load device path, a light responsive element characterized with resistance which varies as a function of received light, a temperature responsive element characterized with resistance which varies as a function of its temperature, said semiconductive switch and an actuating element of said electromechanical switching device being serially connected in a path between power terminals, said light responsive and temperature responsive elements being serially connected between said power terminals, one of said light and temperature responsive elements being connected in a path between emitter and base terminals of said semiconductive switching device and the other of these elements being connected in a path between said base terminal and one of said power terminals, said temperature and light responsive elements as connected controlling the amount of voltage applied to the emitter and base terminals of said semiconductive switching device and thereby effecting with time delay an activating change in the voltage applied to said actuating element of said electromechanical switch from said power terminals when a persisting change in light level on said light responsive element occurs.

5. A circuit for controlling the energization of a load device, said circuit comprising switching means for controlling the continuity of a path through said load device from a power source, said switching means including an electromechanical switching device having contact means in said load device path, a light responsive element characterized with resistance which varies as a function of received light, a temperature responsive element characterized with resistance which varies as a function of its temperature, said elements being connected in a parallel combination which in turn is connected from a power terminal in series with an actuating element of said electromechanical switching device to another power terminal, resistance means connected in parallel with said actuating element, said temperature and light responsive elements as connected effecting with time delay an activating change in voltage applied to said activating element when a persisting change in light level on said light responsive element occurs.

6. A circuit as claimed in claim 5, wherein said resistance means are variable so as to provide for variance in the level of light at which said activating voltage change occurs.

7. A circuit for controlling the energization of a load device, said circuit comprising switching means for controlling the continuity of a path through said load device from a power source, said switching means including an electromechanical switching device having contact means in said load device path, a light responsive element characterized with resistance which varies as a function of received light, a temperature responsive element characterized with resistance which varies as a function of its temperature, one of said elements being connected from a power terminal to a circuit junction and the other of said elements being connected from said circuit junction across an activating element of said electromechanical switching device to another power terminal, said temperature and light responsive elements as connected effecting with time delay an activating change in voltage applied to said activating element when a persisting change in light level on said light responsive element occurs.

8. A circuit for controlling the energization of a load device, said circuit comprising switching means for controlling the continuity of a path through said load device from a power source, said switching means including an electromechanical switching device having contact means in said load device path, a light responsive element characterized with resistance which varies as a function of received light, a temperature responsive element characterized with resistance which varies as a function of its temperature, one of said elements being connected from a power terminal to a circuit junction and the other of said elements being connected from said circuit junction across an activating element of said electromechanical switching device to another power terminal, resistance means connected in parallel with said actuating element, said temperature and light responsive elements as connected effecting with time delay an activating change in voltage applied to said activating element when a persisting change in light level on said light responsive element occurs.

References Cited by the Examiner

UNITED STATES PATENTS

| | | | |
|---|---|---|---|
| 2,280,948 | 4/42 | Gulliksen | 317—124 |
| 2,582,676 | 1/52 | Bordewieck et al. | 317—130 |
| 2,968,466 | 1/61 | McGoldrick | 317—132 |
| 2,978,588 | 4/61 | Mitchell et al. | 317—125 |
| 2,979,628 | 4/61 | Gaon | 317—124 |

FOREIGN PATENTS 1,112,659  11/55  France.

SAMUEL BERNSTEIN, *Primary Examiner.*

LLOYD McCOLLUM, *Examiner.*